United States Patent
Torres-Castellano (10) Patent No.: US 12,145,339 B2
(45) Date of Patent: Nov. 19, 2024

(54) EXPANDABLE DRUM FOR SHAPING PNEUMATIC TIRES THAT COMPRISES A PARALLELOGRAM-TYPE EXPANDER DEVICE FOR RETAINING THE BEAD WIRE

(71) Applicant: COMPAGNIE GENERALE DES ETABLISSEMENTS MICHELIN, Clermont-Ferrand (FR)

(72) Inventor: Miguel Torres-Castellano, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 305 days.

(21) Appl. No.: 17/631,636

(22) PCT Filed: Jul. 28, 2020

(86) PCT No.: PCT/FR2020/051388
§ 371 (c)(1),
(2) Date: Jan. 31, 2022

(87) PCT Pub. No.: WO2021/019183
PCT Pub. Date: Feb. 4, 2021

(65) Prior Publication Data
US 2022/0274363 A1 Sep. 1, 2022

(30) Foreign Application Priority Data
Aug. 1, 2019 (FR) ...................................... 1908823

(51) Int. Cl.
*B29D 30/24* (2006.01)
*B29D 30/32* (2006.01)

(52) U.S. Cl.
CPC .... *B29D 30/247* (2013.01); *B29D 2030/3214* (2013.01)

(58) Field of Classification Search
CPC .... B29D 30/24; B29D 30/244; B29D 30/245; B29D 30/247; B29D 30/32; B29D 30/48;
(Continued)

(56) References Cited

U.S. PATENT DOCUMENTS 4,007,081 A * 2/1977 Mallory ............... B29D 30/245
156/417
4,685,992 A 8/1987 Irie
(Continued)

FOREIGN PATENT DOCUMENTS

CN 107107506 A * 8/2017 ............. B29D 30/24
CN 109624367 A 4/2019
WO 2005/118270 A2 12/2005

OTHER PUBLICATIONS

Monbrun, CN-107107506-A, machine translation. (Year: 2017).*
International Search Report dated Oct. 22, 2020, in corresponding PCT/FR2020/051388 (4 pages).

*Primary Examiner* — Sedef E Paquette
(74) *Attorney, Agent, or Firm* — VENABLE LLP (57) ABSTRACT

A drum (1) for manufacturing a pneumatic tire (2) is provided with a plurality of clamping jaws (12) mounted so as to be movable between a retracted configuration and a deployed configuration which allows the clamping jaws (12) to engage with a bead wire (3) of the tire (2), the clamping jaws (12) being placed, to this end, under the control of a deployment system (13) which comprises an articulated parallelogram (20) having a first, fixed base (25) secured to a shaft (11) and a second, mobile base (26) secured to a clamping jaw (12), and a drive mechanism (30) designed to cooperate with the articulated parallelogram (20) so that it is possible to select and modify the radial position (d26) of the mobile base (26) with respect to the fixed base (25) in order to pass from the retracted configuration to the deployed configuration and vice versa.

10 Claims, 5 Drawing Sheets

(58) Field of Classification Search
CPC .... B29D 2030/3207; B29D 2030/3214; B29D 2030/487; B29D 2030/488
USPC ................................ 156/131, 135, 417, 420
See application file for complete search history.

(56) References Cited

U.S. PATENT DOCUMENTS

| | | | | |
|---|---|---|---|---|
| 5,223,074 | A * | 6/1993 | Miyanaga | B29D 30/32 156/417 |
| 5,273,599 | A * | 12/1993 | Adachi | B29D 30/32 156/131 |
| 5,405,484 | A * | 4/1995 | Wollbrinck | B29D 30/24 156/401 |
| 6,640,863 | B2 * | 11/2003 | Terazono | B29D 30/245 156/402 |
| 2003/0047284 | A1 * | 3/2003 | Akiyama | B29D 30/245 156/416 |
| 2008/0264570 | A1 | 10/2008 | Slots et al. | |

\* cited by examiner

EXPANDABLE DRUM FOR SHAPING PNEUMATIC TIRES THAT COMPRISES A PARALLELOGRAM-TYPE EXPANDER DEVICE FOR RETAINING THE BEAD WIRE

BACKGROUND

The present invention relates to the manufacture of pneumatic tyres, in particular pneumatic tyres for heavy-duty vehicles, and more particularly to the field of expansion drums designed to shape the carcass of the pneumatic tyre.

Generally, the carcass of the tyre is produced "flat", meaning by disposing the various constituents thereof on the circular-base cylindrical surface of a drum. Bead wires, that is to say reinforcing bands, which are generally metallic, are then fitted on this carcass, said bead wires being intended to be integrated into the structure of the bottom region of the pneumatic tyre to make it possible to attach said pneumatic tyre to a rim and retain it thereon.

To subsequently shape the carcass, so as to give said carcass a domed, substantially toric, shape, the drum effects expansion of the central part of the carcass, by inflation or by radial deployment of plates known as "expansion tiles", and moves the bead wires of the tyre axially towards one another.

The drum is also designed to hold the carcass while a crown block is being secured to the carcass thus shaped, said crown block comprising in particular the tread and one or more reinforcing plies, and while roller-pressing is carried out to expel air and ensure perfect cohesion between said crown block and the carcass.

In order for the bead wires to be held firmly during these operations of shaping the carcass and then of roller-pressing, it is known to use radial clamping devices which comprise a plurality of clamping jaws, said jaws being distributed around the central axis of the drum and mounted so as to be radially movable between a retracted position, close to the axis, which makes it possible to fit the bead wire, loosely, on the drum, and a deployed position in which said jaws engage with the inside diameter of said bead wire in order to exert a centrifugal clamping force on said bead wire.

In order to effect the radial deployment of the clamping jaws, it is in particular known, for example from the document WO-2005/118270, to use wedges that have a bearing surface, known as a "slope", which is inclined with respect to the central axis, said slope cooperating with a complementary slope provided on the jaw in question. By moving the wedges in translation parallel to the central axis of the drum, for example by means of a pneumatic cylinder, it is thus possible to gradually move the jaws away from the central axis.

In spite of their undeniable robustness, such deployment systems can have a number of drawbacks, however.

Specifically, such deployment systems having wedges are relatively bulky, and need to be positioned axially in the immediate vicinity of the jaws, as close as possible to the region known as the "central region" of the drum, which is comprised axially between the two bead wires and occupied by the carcass intended to be deployed.

However, there is little available space in said central region, which also needs to accommodate the set of plates, known as "expansion tiles", which are distributed around the circumference of the drum and which are intended to be deployed radially, against the radially inner surface of the carcass, in order to push back said radially inner surface of the carcass so as to shape the latter.

It is all the more difficult to reconcile these imperatives associated with the bulk of the various systems equipping the drum since it is necessary to confer relatively large dimensions on the constituent members of the deployment system, such that said deployment system is capable of generating and supporting significant axial forces, and of converting these axial forces into a centrifugal radial force which has a sufficiently high intensity to prevent, in particular when the carcass is subjected to the roller-pressing operation, any sliding of the constituent elements of said carcass which are situated, and therefore compressed, between the jaw and the bead wire, as is the case in particular for the carcass ply.

Moreover, if the pressure supplying the cylinders actuating the wedges is released, some known deployment systems may sag, and this may have a negative effect on the process of manufacturing the pneumatic tyre, and on the safety of the operator, in particular if pneumatic tyres having large dimensions are being produced, such as tyres intended for heavy-duty vehicles or construction plant vehicles, these therefore integrating particularly large and heavy bead wires.

Next, in spite of the presence of a slope, or even of several successive slopes having different inclinations, it is sometimes difficult to control the intensity and progressive nature of the deployment force that is exerted by means of the wedges against the bead wire and the underlying carcass ply, and this may complicate the control of the drum.

Lastly, to limit wear on the wedges and maintain the quality and precision of the deployment system, it is necessary to make specific provisions with regard to the surface states of the slopes, and to provide suitable lubrication.

The objects assigned to the invention therefore seek to overcome the abovementioned drawbacks and to propose a novel expandable drum which has a clamping device that is not very bulky, performs well, is simple and safe.

SUMMARY

The objects assigned to the invention are achieved by means of a drum intended for manufacturing a pneumatic tyre comprising at least one annular bead wire, said drum having a central axis $Z1$ and being provided with a clamping device which comprises a shaft fitted along the central axis $Z1$, said shaft bearing a plurality of clamping jaws which are distributed in several angular sectors about said central axis $Z1$ and which are placed under the control of a deployment system which makes it possible to modify the radial distance of said clamping jaws with respect to the central axis $Z1$ such that said clamping jaws define an expandable seat that the deployment system moves alternately from a retracted configuration, in which said expandable seat occupies a first diameter known as the "resting diameter", which is less than the inside diameter of the bead wire, to a deployed configuration, in which the clamping jaws are radially further away from the central axis $Z1$ than in the retracted configuration, such that the expandable seat extends over a second diameter known as the "clamping diameter", which is greater than the resting diameter and which allows said expandable seat to engage against the inside diameter of the bead wire and to exert a centrifugal clamping force on said bead wire, said drum being characterized in that the deployment system comprises an articulated parallelogram, the four apexes of which respectively form a first, a second, a third and a fourth pivot, the first pivot and the second pivot being secured to the shaft and positioned respectively at a first radial distance from the central axis $Z1$ and at a second radial distance from the central axis Z1, greater than the first radial distance, so as to define a first base known as the "fixed base" of the articulated parallelogram which extends transversely to the central axis Z1, while the third pivot and the fourth pivot are secured to a clamping jaw and define a second base known as the "mobile base" of the articulated parallelogram, which is kept parallel to the fixed base by a first arm which connects the first pivot to the third pivot so as to define a first side of the articulated parallelogram, and by a second arm which connects the second pivot to the fourth pivot so as to define a second side of the articulated parallelogram, parallel to the first side, and in that the deployment system comprises a drive mechanism designed to cooperate with the articulated parallelogram so that it is possible to select and modify the radial position of the mobile base with respect to the fixed base in order to pass from the retracted configuration to the deployed configuration and vice versa.

Advantageously, the use of a structure having an articulated parallelogram makes it possible, by virtue of the length of the first arm and second arm, to relocate a part of the deployment system, and more particularly the fixed base of the parallelogram and the portion of the shaft that supports said fixed base and ensures the anchoring thereof at an axial distance from the central region of the drum.

The invention therefore advantageously makes it possible to free up the space in said central region, while providing the deployment system, at a distance from said central region, with secure anchoring which ensures in particular good absorption of the axial forces that are exerted within said deployment system.

Moreover, such an articulated structure reduces the risks of seizing, and limits the needs for material for lubricating or finishing the surfaces of the moving members in question.

In addition, as will be shown below, the use of an articulated parallelogram makes it possible to fit a particularly progressive and powerful drive mechanism, which makes it possible to exert a high-intensity but finely controlled centrifugal radial force on the bead wire.

Similarly, this geometry in the form of a parallelogram is favourable to the fitting of a simple non-return mechanism, which ensures the absence of accidental sagging of the deployment system and of the seat in the event of the energy supply of said deployment system being interrupted or failing.

BRIEF DESCRIPTION OF THE FIGURES

Further subjects, features and advantages of the invention will become apparent in more detail from reading the following description and with the aid of the appended drawings, which are provided purely by way of illustration and without limitation and in which.

DETAILED DESCRIPTION

The present invention relates to a drum 1 intended for manufacturing a tyre 2. Said tyre 2 is preferably a pneumatic tyre 2 and may be categorized as a pneumatic tyre in the following text.

In a manner known per se, such a tyre 2 comprises at least one annular bead wire 3.

Such a bead wire 3 is intended to reinforce the part known as the "bottom region" of the tyre 2, which makes it possible to attach the tyre to a rim.

The bead wire 3 forms a circular ring, which is closed on itself about a central axis, known as the "bead-wire central axis" Z3.

D3_in denotes the inside diameter of the bead wire 3 at rest, in the absence of external stresses that would tend to deform said bead wire by ovalization, twisting, circumferential extension, etc.

Furthermore, the term "mean line" L3 could be used to denote the curved line closed on itself, in this case preferably a circular line, which is made up of all of the centres of the cross sections of the bead wire 3 as considered along said bead wire 3, about the central axis Z3 of said bead wire.

In a manner known per se, the bead wire 3 is preferably formed from one or more wires made of a material chosen for its mechanical strength, for example a metal material or a composite material.

The wire(s) may optionally be coated in rubber, individually or as a whole.

According to one possible embodiment, the constituent wires of the bead wire 3 may be wound in a helix about the mean line L3 so as to be interwoven to form a braided torus centred on the bead-wire central axis Z3.

According to another possible embodiment, the wires could be arranged in juxtaposed contiguous turns which are normal to the central axis Z3 of the bead wire and which each form a loop about said central axis Z3, as a result each having a diameter equal to or greater than the inside diameter D3_in of the bead wire 3.

Figure 1:
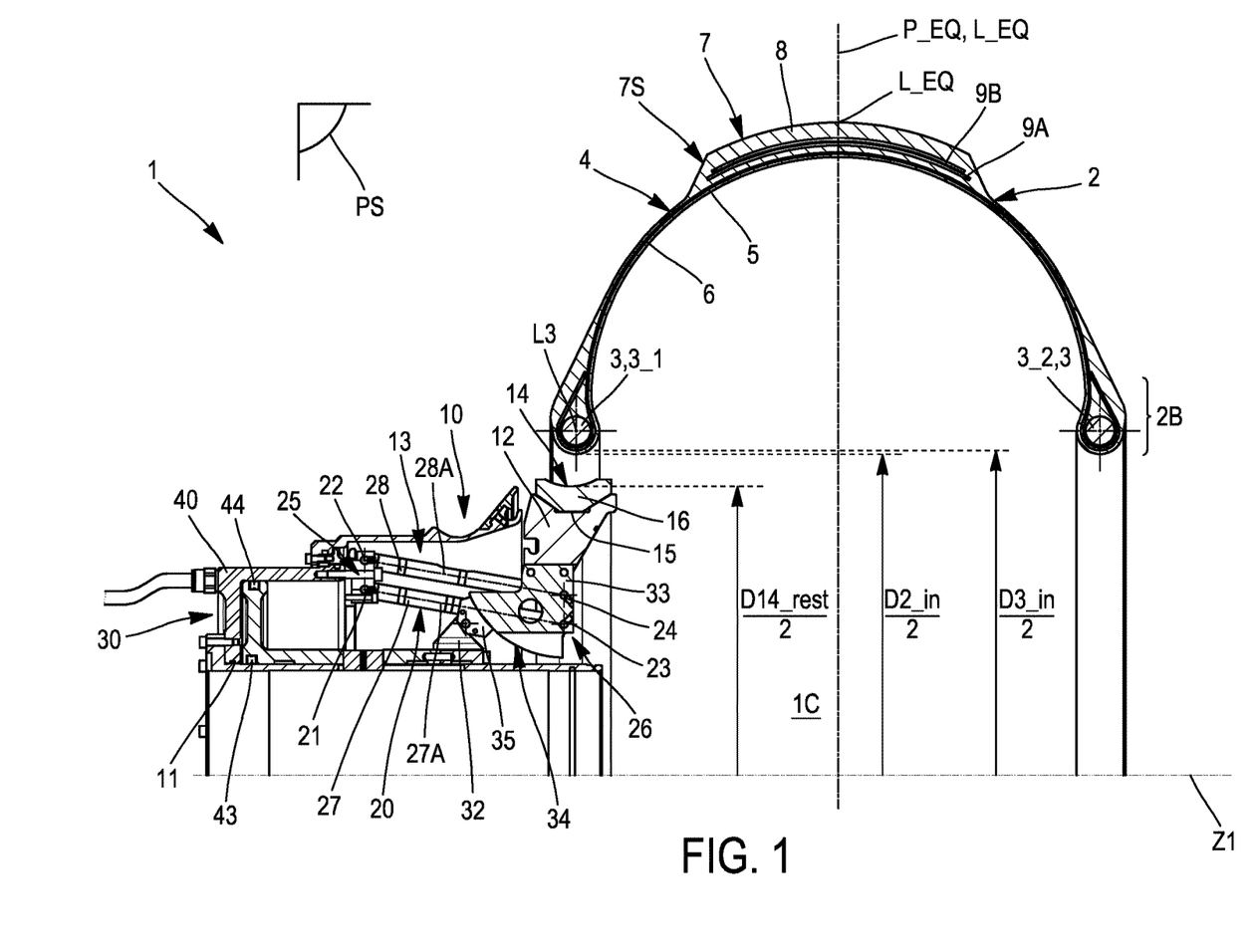
FIG. 1 illustrates, in a view in cross section on a sagittal plane containing the central axis of the drum, a drum portion according to the invention in the retracted configuration, and the pneumatic tyre being manufactured.
Figure 2:
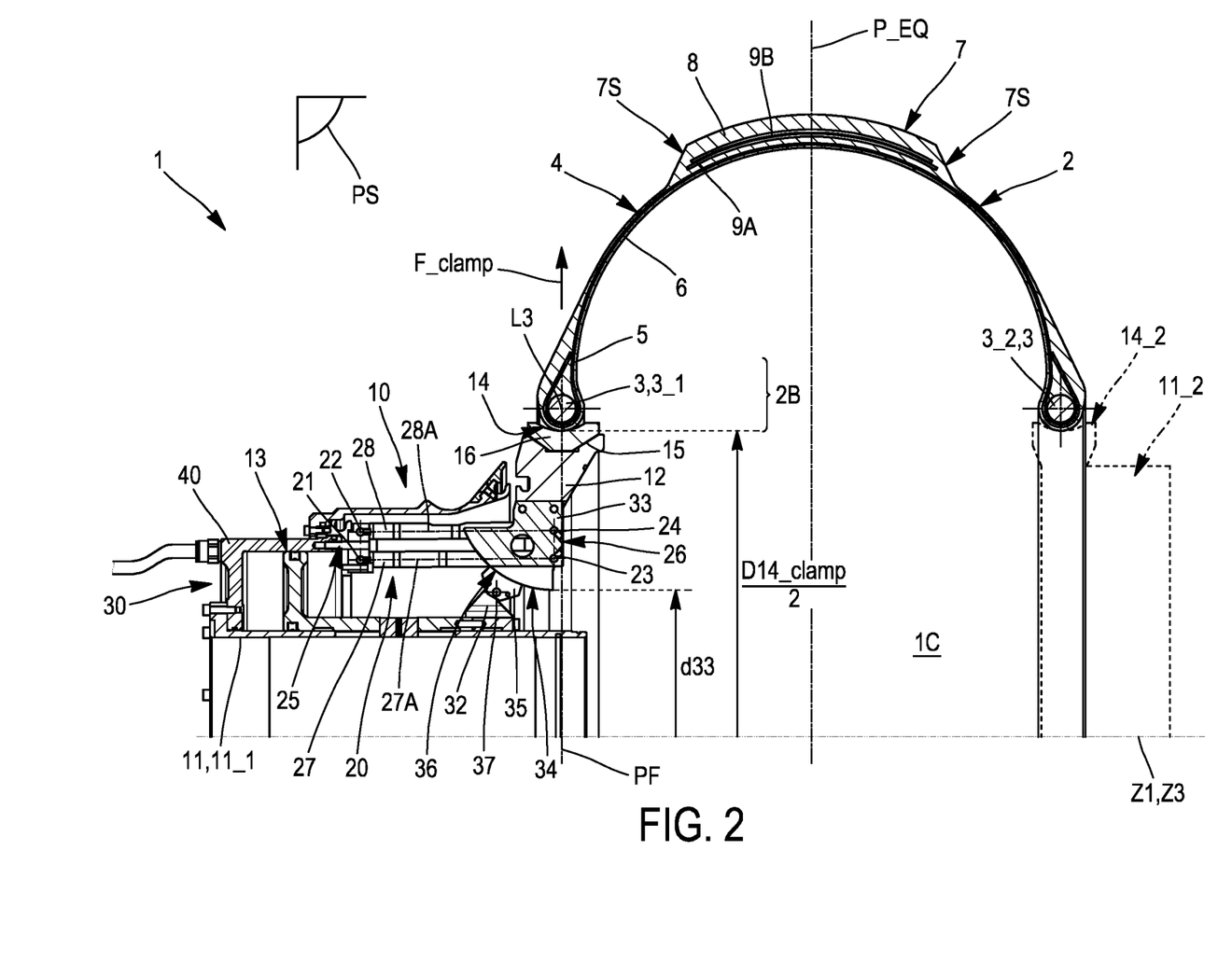
FIG. 2 illustrates, in a view in cross section taken in the same sagittal cross-sectional plane as FIG. 1, the drum of FIG. 1 placed in the deployed configuration for ensuring the centrifugal clamping of the bead wires of the pneumatic tyre.

Preferably, as can be seen in FIGS. 1 and 2, the tyre 2 comprises two annular bead wires 3, namely a first bead wire 3_1 and a second bead wire 3_2, which are disposed on either side of the equatorial plane P_EQ of said tyre 2.

By convention, the "central region" 1C of the drum 1 will denote the region of the space which is comprised axially, along the central axis Z1 of the drum, between the first bead wire 3_1 and the second bead wire 3_2 and which therefore contains, inter alia, the equatorial plane P_EQ of the tyre.

In a manner known per se, the tyre 2 also comprises a carcass 4.

Said carcass 4 comprises, in a manner known per se, and as can be seen in FIGS. 1 and 2, a carcass ply 5 which extends from the first bead wire 3_1 to the second bead wire 3_2.

Moreover, the radially inner face of the carcass ply 5 is preferably covered with a layer of rubber, known as the inner liner 6, which is impermeable to the fluid, typically air, used for inflating the pneumatic tyre 2.

The tyre 2 also comprises a crown block 7, which has a tread 8 and reinforcing plies 9A, 9B provided with mutually parallel reinforcing threads.

Typically, the tyre 2 could comprise a superposition of at least two reinforcing plies 9A, 9B referred to as "crossed", meaning that the reinforcing threads of the first reinforcing ply 9A are disposed, with respect to the equatorial line L_EQ of the tyre 2, at an angle, known as the "first-ply angle", which has a sign opposite to the sign of the angle, known as the "second-ply angle", formed by the reinforcing threads of the second reinforcing ply 9B with respect to this same equatorial line L_EQ, such that the threads of the first reinforcing ply 9A cross the threads of the second reinforcing ply 9B.

As can be seen in FIGS. 1 to 4, the drum 1 has a central axis Z1.

Said central axis Z1 is preferably horizontal, in particular so as to make it easier to fit the constituent members of the tyre 2 and to handle said tyre 2, and to avoid, during the operation of shaping the tyre 2, any tendency of the tyre 2 to deform unevenly, owing to gravity.

The drum 1 is also provided with a clamping device 10.

This clamping device 10 makes it possible to firmly hold the bead wire 3, and the radially underlying carcass ply 5, in the desired position during the shaping of the carcass 4 and then during the operation of fixing the crown block 7 to said carcass 4.

Said step of fixing the crown block 7 to the carcass 4 preferably comprises a roller-pressing operation, during which a roller is used to press the crown block 7, in particular the shoulders 7S of said crown block, onto the carcass 4, from the outside of the tyre 2, in order to improve the cohesion of the tyre 2.

The clamping device 10 comprises a shaft 11, which is preferably cylindrical, and more particularly cylindrical with a circular base, which is fitted on the central axis Z1 of the drum, and more preferably centred on said central axis Z1.

As illustrated in FIGS. 1 to 4, said shaft 11 carries a plurality of clamping jaws 12 which are distributed in several angular sectors about the central axis Z1 and are placed under the control of a deployment system 13 which makes it possible to modify the radial distance of said clamping jaws 12 with respect to the central axis Z1.

Figure 3:
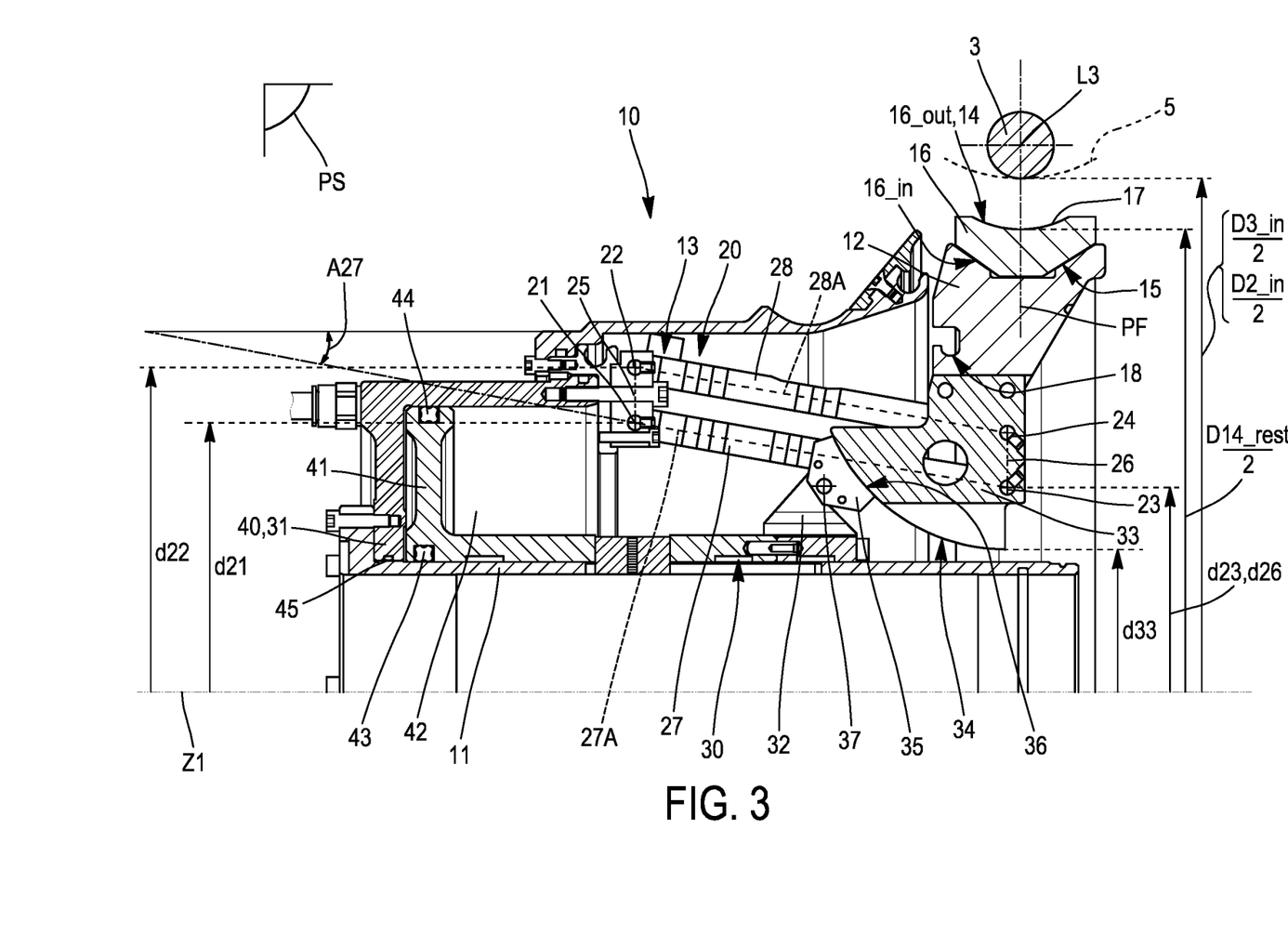
FIG. 3 is a detail view in axial section of the deployment system of the drum in FIG. 1, in the retracted configuration.
Figure 4:
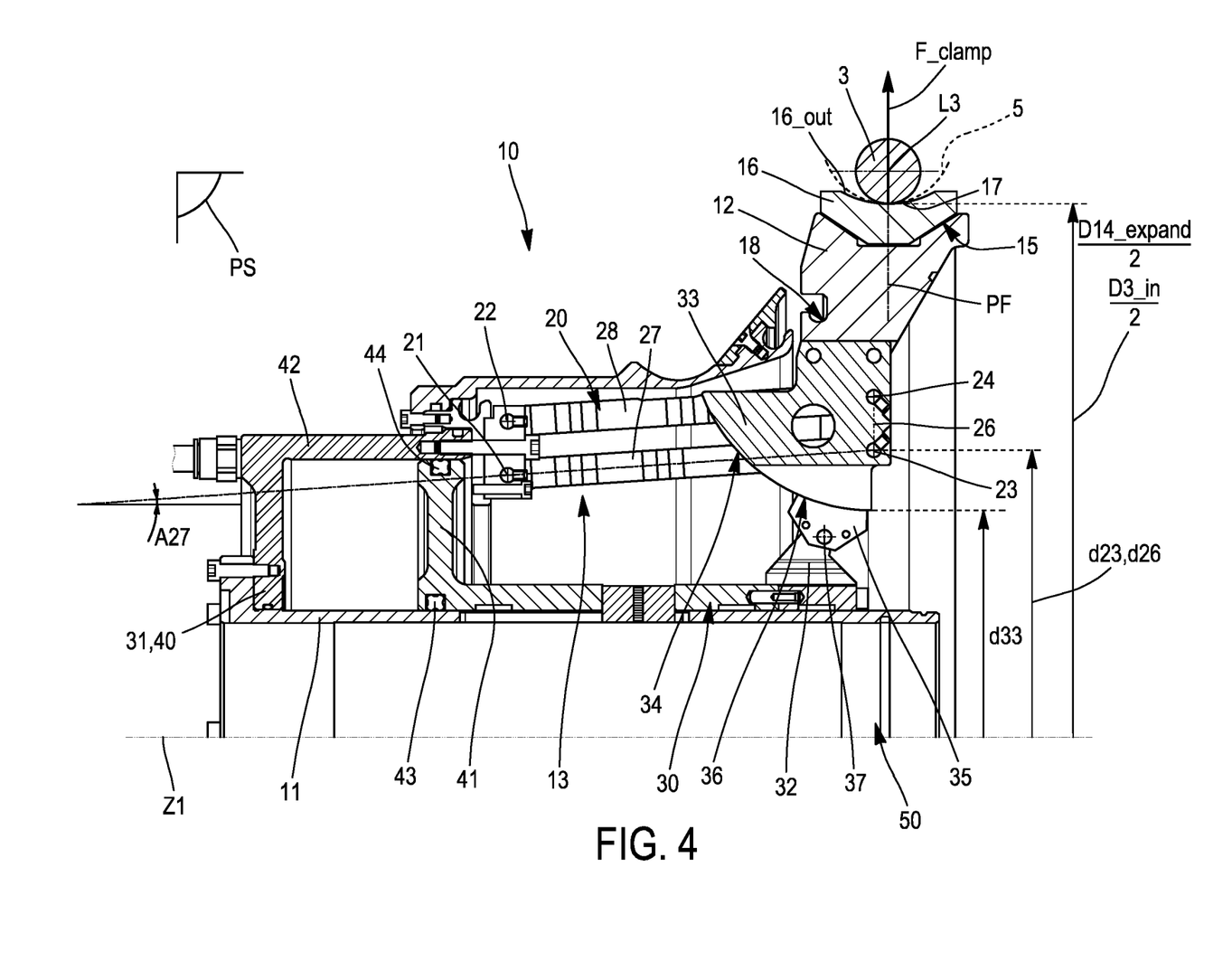
FIG. 4 is a detail view in axial section of the deployment system of the drum in FIG. 2, in the deployed configuration.

As a result, said clamping jaws 12 define an expandable seat 14 that the deployment system 13 moves alternately from a retracted configuration, in which said expandable seat 14 occupies a first diameter known as the "resting diameter" D14_rest, which is less than the inside diameter D3_in of the bead wire 3, as illustrated in FIGS. 1 and 3, to a deployed configuration, in which the clamping jaws 12 are radially further away from the central axis Z1 than in the retracted configuration, such that the expandable seat 14 extends over a second diameter known as the "clamping diameter" D14_clamp, which is greater than the resting diameter D14_rest and which allows said expandable seat 14 to engage against the inside diameter D3_in of the bead wire 3 and to exert a centrifugal clamping force F_clamp on said bead wire 3, as illustrated in FIGS. 2 and 4.

Of course, the deployment system 13 will be arranged to as to be able, reciprocally, to return the seat 14 from its deployed configuration to its retracted configuration, in particular to allow the operator to withdraw the tyre 2, preferably an uncured tyre 2 (that is to say a non-vulcanized tyre), obtained after shaping and roller-pressing, from the drum 1, in order for example to then be able to transfer said uncured tyre 2 into a curing mould.

For the convenience of the description, reference could be made to the retracted configuration and to the deployed configuration both for the drum 1 as a whole and for all or some of the elements of said drum 1 that are involved in the changes of configuration, these including in particular the expandable seat 14, the clamping jaws 12, or all or part of the deployment system 13.

The resting diameter D14_rest that the seat 14 adopts in the retracted configuration is chosen to be sufficiently smaller than the inside diameter D3_in of the bead wire 3 first and foremost to allow an operator (this operator either being the rest of an automated robot or a human, optionally assisted by mechanical handling means) to axially fit the bead wire 3 on the drum 1, until said bead wire 3 is brought, in a loose state, into the desired axial position, with respect to the carcass ply 5, along the central axis Z1, before the operation of shaping the carcass 4, and then to release the bead wire 3 and more generally the tyre 2, after the operations of shaping the carcass 4 and fixing the crown block 7, in order to allow the operator to withdraw the shaped tyre 2 from the drum 1.

In practice, the resting diameter D14_rest of the seat 14 will therefore be strictly less than the inside diameter D2_in of the tyre 2 at rest, that is to say than the diameter of the cylindrical empty space which is situated at the centre of the tyre 2 and which is delimited radially by said tyre 2, and encircled by the bead wire 3, in the axial position of the bead wire 3 in question.

Geometrically, the inside diameter D2_in of the tyre will correspond to the diameter of the free passage section, the circumference of which is delimited by the tyre 2, about the central axis Z1, such that this diameter D2_in is considered in a plane normal to the central axis Z1 and containing the mean line L3 of the bead wire 3 in question. In practice, the inside diameter D2_in of the tyre corresponds preferably to the narrowest passage section of said tyre 2.

It will therefore be noted that, strictly speaking, as can be seen in FIG. 1, the inside diameter D2_in of the tyre is strictly less than the inside diameter D3_in of the bead wire 3, considered at rest in the absence of tensile elongation of said bead wire 3, in as much as said inside diameter D2_in of the tyre likewise depends on the radial thickness of the intermediate layer(s) making up the bottom region 2B of said tyre 2, which are disposed radially beneath the bead wire 3, between the bead wire 3 and the central axis Z1, and which include in particular the layer formed by the carcass ply 5 and, if necessary, one or more thicknesses of rubber forming a protective bead around the section of the bead wire 3.

However, for the simple convenience of the description, and given the relatively small thickness of these intermediate layers with regard to the inside diameter D3_in of the bead wire 3, the inside diameter D2_in of the tyre 2 could, to a first approximation, be equated in the following text to the inside diameter D3_in of the bead wire.

It will also be noted that, in the deployed configuration, the central axis Z3 of the bead wire 3 coincides preferably with axis the central axis Z1 of the drum 1.

In the deployed configuration, the clamping diameter D14_clamp of the seat 14 will of course be chosen so as to generate, on the bead wire 3, a sufficient clamping force F_clamp to immobilize the bead wire 3 with respect to said seat 14, and in particular to prevent said bead wire 3, and the underlying carcass ply 5, from sliding with respect to said seat 14 along the central axis Z1, during the operations of shaping the carcass 4 and then fixing the crown block 7, and more particularly during the operation of roller-pressing.

It will be noted in this regard that, on account of its intrinsic stiffness, the bead wire 3 may be considered to be substantially inextensible under circumferential tension along its mean line L3. It is therefore possible to generate a very high centrifugal clamping force F_clamp without otherwise having to extend the circumference of the bead wire 3, which therefore, when it is subjected to the clamping force F_clamp, preserves more or less the same inside diameter as the diameter D3_in that it occupied at rest.

In practice, the clamping diameter D14_clamp of the seat 14 in the deployed configuration is preferably substantially equal to the inside diameter D3_in of the bead wire at rest, taking into account, where appropriate, both interposed thicknesses of rubber and of the carcass ply 5, which are situated radially between the bead wire 3 and the seat 14, and the degree of elastic compression of these thicknesses under the clamping force F_clamp.

For the reasons already set out above, it may therefore be considered that the clamping diameter D14_clamp may be equated, for the convenience of the description, to the inside diameter D3_in of the bead wire.

Of course, given the azimuthal distribution of the clamping jaws 12 about the central axis Z1, the clamping force F_clamp exerted on the bead wire 3 by the seat 14 in the deployed configuration is advantageously distributed on either side of the central axis Z1, around the interior circumference of the bead wire 3.

In other words, the clamping force F_clamp is multidirectional, in that it is exerted centrifugally in a plurality of radial directions that are distributed, in terms of azimuth about the central axis Z1, within an angular sector which covers overall more than 180 degrees about said central axis Z1.

Thus, in each radial direction considered in terms of azimuth about the central axis Z1, the clamping force F_clamp will result in a first force component oriented in a first direction, which acts on a first sector of the bead wire 3, and a second component of opposite sign, which acts on a second sector of the bead wire 3 diametrically opposite the first sector with respect to the central axis Z3 of the bead wire, and which thus balances the first component so as to keep the bead wire 3 in a constant radial position with respect to the central axis Z1 of the drum 1.

Such a centrifugal, multidirectional clamping force F_clamp advantageously provides, in the deployed configuration, balanced and relatively uniform clamping, and a self-centring effect of the bead wire 3 on the central axis Z1 of the drum 1.

The keeping of the bead wire 3 on the seat 14, and more generally with respect to the drum 1, is therefore particularly solid and stable, both axially and radially.

Preferably, the clamping jaws 12 will be distributed evenly about the central axis Z1, on the circumference of the shaft 11, such that the clamping device 10 will not vary when rotated by approximately N about the central axis Z1, N being the whole number of clamping jaws 12.

Preferably, the clamping jaws 12 are provided, on their radially outer face, as can be seen in FIGS. 1 to 4, with a circumferential housing 15, preferably in the form of a V-shaped slot.

Preferably, this circumferential housing 15 defines the seat 14 for receiving the bead wire 3.

The recessed shape of the circumferential housing 15 advantageously provides a stable hold, both radially and axially, of the bead wire 3 within the clamping jaw(s) 12 in question.

Preferably, a banding strip 16, made of elastomer material, will be fitted in the circumferential housing 15 of the clamping jaws 12.

The banding strip 16 rests against each clamping jaw 12 by way of its radially inner face 16_in, while the radially outer face 16_out of said banding strip 16 then forms the seat 14 on which the tyre 2 and the bead wire 3 come to rest.

Said banding strip 16 advantageously forms a continuous annular band that is closed about the central axis Z1.

The banding strip 16 thus creates bridges that ensure continuity of the seat 14 over the outer perimeter of each clamping jaw 12 and between the clamping jaws 12, thereby making it possible to smooth the circumference of the seat 14 in spite of the angular division of the clamping jaws 12. The seat 14 thus affords, in the deployed configuration, continuous annular support for the tyre 2 and the bead wire 3.

The passage into the deployed configuration allows the radially outer surface 16_out of the banding strip, and therefore more generally the seat 14, to hug the interior of the bead wire 3 around the entire perimeter of said bead wire 3. Conversely, in the deployed configuration, the bead wire 3 therefore rests around the entire circumference of said seat 14.

Advantageously, the banding strip 16 may, by virtue of its intrinsic elasticity, elastically accommodate, by circumferential extension and therefore by adaptation of its diameter, the variations in the diameter D14 of the seat 14 during the passage from the retracted configuration to the deployed configuration, and vice versa.

Moreover, this elasticity of the banding strip 16 makes it possible, in the manner of a cushion, to adapt and homogenize the centrifugal radial compressive force that the seat 14 exerts on the bead wire 3 and the intermediate layers, in particular the carcass ply 5, thereby ensuring a relatively flexible hold of the bead wire 3 and more generally of the tyre 2, and therefore avoiding localized damage to the tyre 2 being caused by an excessive stress concentration.

Furthermore, the elastic stress, of the centripetal constriction type, that the banding strip 16 exerts on the clamping jaws 12 advantageously brings about an effect of cohesion and self-centring of the clamping jaws 12 as a whole with respect to the central axis Z1, and also generates a return force which makes it easier for said clamping jaws 12, and the deployment system 13, to return from the deployed configuration to the retracted configuration.

According to one embodiment variant, which may be implemented in particular if the drum 1 does not have a banding strip 16, provision could be made, in order to exert a self-centring force for returning each clamping jaw 12 to the retracted configuration, of an annular return spring, which could for example be housed in an annular attachment groove 18 that is provided in said clamping jaw 12, centred on the central axis Z1, and separate from the circumferential housing 15 forming the seat 14, as can be seen in FIGS. 3 and 4.

It will be noted that the clamping device 1 is preferably dimensioned such that the banding strip 16 and/or, respectively, the annular return spring housed in the attachment groove 18, is already preloaded, under elastic circumferential tension, when the clamping device 10 is in the retracted configuration, and that the intensity of this tensile stress increases when passing from the retracted configuration to the deployed configuration.

By permanently keeping the banding strip 16, and/or, respectively, the annular return spring, under tension, and therefore not in a loose state, a situation is avoided in particular in which said banding strip 16, or, respectively, said return spring, does not slip out of the circumferential housing 15, or, respectively, out of the attachment groove 18, of the clamping jaws 12.

Of course, the banding strip 16 could have any appropriate sectional shape.

Preferably, said banding strip 16 could be arranged so as to have an annular groove 17 forming the seat 14, which makes it possible to receive the bead wire 3.

Advantageously, the radially outer face 16_out of the banding strip 16 will thus have a recessed seat 14 profile, which will form a stable receptacle for the bead wire 3.

According to the invention, the deployment system 13 comprises an articulated parallelogram 20, the four apexes of which respectively form a first pivot 21, a second pivot 22, a third pivot 23 and a fourth pivot 24.

The respective axes of rotation of these four pivots are preferably mutually parallel, and preferably disposed perpendicularly to a reference plane, known as the "sagittal plane" PS, which contains the central axis Z1 and which thus preferably divides the drum 1 into two parts that are substantially if not exactly symmetric to one another.

This sagittal plane PS corresponds here to the section plane used for FIGS. 1, 2, 3 and 4.

Among other advantages, a structure in the form of an articulated parallelogram 20 is very simple, undeniably lightweight, and relatively compact with regard to the amplitude of the movements allowed by such a structure.

As can be seen clearly in FIGS. 3 and 4, the first pivot 21 and the second pivot 22 are secured to the shaft 11 and positioned respectively at a first radial distance d21 from the central axis Z1 and at a second radial distance d22 from the central axis Z1, said second radial distance d22 being greater than the first radial distance d21, so as to define a first base 25 known as the "fixed base" 25 of the articulated parallelogram 20, said fixed base 25 extending transversely to the central axis Z1, while the third pivot 23 and the fourth pivot 24 are secured to a corresponding clamping jaw 12 and define a second base 26 known as the "mobile base" 26 of the articulated parallelogram 20.

It will be noted that, within the fixed base 25, the first pivot 21 is, and remains (whether in the retracted configuration, in the deployed configuration, during the passage from the retracted configuration to the deployed configuration, or vice versa), closer to the central axis Z1 than the second pivot 22. Similarly, within the mobile base 26, the third pivot 23 is, and remains, radially closer to the central axis Z1 than the fourth pivot 24, in the retracted configuration, in the deployed configuration, or during the passage from one of these configurations to the other.

The mobile base 26 is kept parallel to the fixed base 25 by a first arm 27 which connects the first pivot 21 to the third pivot 23 so as to define a first side 27A of the articulated parallelogram 20, and by a second arm 28 which connects the second pivot 22 to the fourth pivot 24 so as to define a second side 28A of the articulated parallelogram 20, parallel to the first side 27A.

The "first side" 27A denotes here, regardless otherwise of the shape of the first arm 27 that is used to materially connect the first pivot 21 to the second pivot 23, the straight-line segment which, geometrically, joins the first pivot 21 to the third pivot 23, and more particularly the straight-line segment that is perpendicular to and intersects the axes of the first pivot 21 and of the third pivot 23 and which thus joins, in the sagittal plane PS, the centre of rotation of the first pivot 21 to the centre of rotation of the third pivot 23, that is to say which joins the first apex of the articulated parallelogram 20 to the third apex of the articulated parallelogram 20.

Similarly, the "second side" 28A denotes, mutatis mutandis, the straight-line segment which geometrically joins the second apex of the articulated parallelogram 20, and therefore the centre of rotation of the second pivot 22, to the fourth apex of the articulated parallelogram 20 formed by the centre of rotation of the fourth pivot 24.

It will be noted that the shape of the first arm 27, or, respectively, the shape of the second arm 28, may vary without departing from the scope of the invention.

This being the case, by simplicity of construction, the first arm 27 and the second arm 28 will preferably be straight, and therefore mutually parallel, so as to coincide with the first side 27A and, respectively, with the second side 28A, at least in the abovementioned sagittal plane PS, as is illustrated in FIGS. 1, 2, 3 and 4.

On account of the arrangement in the form of a parallelogram, the length of the fixed base 25, which is equal to the centre-to-centre spacing between the first pivot 21 and the second pivot 22, is equal to the length of the mobile base 26, which corresponds for its part to the centre-to-centre spacing between the third pivot 23 and the fourth pivot 24.

Similarly, the length of the first side 27A defined by the first arm 27, which is equal to the centre-to-centre spacing between the first pivot 21 and the third pivot 23, is also equal to the length of the second side 28A which corresponds to the centre-to-centre spacing between the second pivot 22 and the fourth pivot 24.

By way of indication, the length of said first side 27A and second side 28A, which depends in particular on the permitted size of the drum 1 and on the diameter of the portion known as the "seat" of the bottom region 2B of the tyre 2, which is intended to rest on the rim, may be between 120 mm and 200 mm, preferably between 140 mm and 180 mm, and for example equal to 152 mm.

The arrangement of the articulated parallelogram 20 according to the invention, with a fixed base 25 which extends transversely to the central axis Z1, or perpendicularly to said central axis Z1, advantageously makes it possible to position the fixed part of said articulated parallelogram 20, namely the fixed base 25 secured to the shaft 11, at an axial distance from the mobile base 26, and therefore at an axial distance from the clamping jaws 12 and from the central region 1C of the drum, and to keep said fixed base 25 at an axial distance from said clamping jaws 12 and from the central region 1C of the drum during the passage from the retracted configuration to the deployed configuration.

Thus, a significant part of the volume occupied by the deployment system 13 is situated outside the central region 1C of the drum 1.

According to a preferred arrangement of the invention, the length of the fixed base 25, that is to say the centre-to-centre spacing between the first pivot 21 and the second pivot 22, is strictly less than the length of the first side 27A, that is to say the centre-to-centre spacing between the first pivot 21 and the third pivot 23.

In other words, the first and second bases 25, 26 preferably form the short sides of the articulated parallelogram 20, while the first and second arms 27, 28 define the long sides of said articulated parallelogram 20.

Such an arrangement makes it possible to minimize the radial size of the deployment system 13, while favouring the axial offset of the fixed base 25 with respect to the mobile base 26 which carries the clamping jaw 12, since the distance of said axial offset depends on the length chosen for the first side 27A.

Preferably, the fixed base 25 extends in a plane substantially normal to the central axis Z1 of the drum 1, for example forming an angle of between −5 degrees and +5 degrees with respect to the plane normal to said central axis Z1, and particularly preferably in a plane exactly normal to said central axis Z1.

In addition to the fact that such a transverse, or radial, orientation of the fixed base 25, and therefore of the mobile base 26 which is parallel to the latter, helps to free up the central region 1C of the drum, as indicated above, such an arrangement makes it possible to move the clamping jaw 12 along a path that is substantially radial with respect to the shaft 11 during the passage from the retracted configuration to the deployed configuration, and makes it easier to generate a clamping force F_clamp comprising a centrifugal component, perpendicular to the central axis Z1, which has a high strength.

Furthermore, preferably, the inclination angle A27 formed, with respect to the central axis Z1, by the first side 27A of the articulated parallelogram 20, which joins the first pivot 21 to the third pivot 23, remains between −15 degrees and +15 degrees, preferably between −10 degrees and +6 degrees, during the passage from the retracted configuration to the deployed configuration and vice versa.

It will of course be the same for the inclination angle, which is identical given the parallelism, formed by the second side 28A with respect to the central axis Z1.

By convention, the inclination angle A27 could be measured between the central axis Z1 and the first side 27A, or, respectively, the second side 28A, in the sagittal plane PS which is normal to the respective axes of rotation of the pivots 21, 23 connected by said side 27A, and which contains the central axis Z1.

The inclination angle A27 will, by convention, be counted as negative when the first arm 27 tilts in a convergent manner towards the central axis Z1, that is to say gets closer to said central axis Z1 with increasing distance from the first pivot 21 towards the third pivot 23 and the central region 1C of the drum, such that said first arm 27 follows a downward slope, as can be seen in FIGS. 1 and 3, and, by contrast, the inclination angle A27 will, by convention, be counted as positive when the first arm 27 diverges from the central axis Z1 as it gets progressively further away from said central axis Z1 with increasing distance from the first pivot 21 towards the third pivot 23 and the central region 1C, such that said first arm 27 follows an upward slope, as can be seen in particular in FIG. 4.

Advantageously, by disposing and confining the first side 27A, and therefore in this case the first arm 27, and consequently likewise the second side 28A parallel to said first side 27A, in a substantially axial orientation, more or less parallel to the central axis Z1 of the drum, it is possible:

both to move the fixed base 25 axially away from the mobile base 26 and therefore from the central region 1C of the drum 1, by an offsetting distance which is more or less equal to the length of the first side 27A, such that full advantage is taken of the length of the first arm 27 to realize this axial offset, and to keep the undesired axial displacement of the mobile base 26 with respect to the shaft 11, during the pendular pitching movement of the first and second arms 27, 28, which allows the passage from the retracted configuration to the deployed configuration, below a predetermined tolerance threshold, for example fixed at 0.5 mm (five tenths of a millimetre).

As regards this last point, it will specifically be noted that, ideally, it is desired for the movement of the clamping jaws 12 that is necessary on passing from the retracted configuration to the deployed configuration not to have a negative effect, or at the very least not to have a significant negative effect, on the axial position of the bead wire 3 with respect to the shaft 11, in particular such that the clamping operation does not cause any deformation or destabilization of the constituent elements of the carcass 4. In this regard, a movement of the clamping jaws 12 that is as perpendicular as possible with respect to the central axis Z1, and therefore virtually radial or strictly radial, will preferably be sought.

More particularly, the passage from the retracted configuration to the deployed configuration can be considered to take place via an intermediate configuration, known as the "partially deployed configuration", in which the mobile base 26 is further away from the central axis Z1 than in the retracted configuration, and which corresponds to the stage at which the seat 14 comes into contact with the tyre 2 so as to start to exert a supporting action on the bead wire 3, and then to continue when the radial spacing of said mobile base 26 with respect to the central axis Z1 is increased, and therefore so is the clamping force exerted on the bead wire 3, until the final configuration is reached, namely the fully deployed configuration, to which the desired clamping force F_clamp corresponds.

The axial displacement of the seat 14, and therefore of the bead wire 3 is thus intended to be minimized during the passage, which will be denoted "clamping travel", from the intermediate, partially deployed configuration to the final, fully deployed configuration, that is to say between the moment at which the seat 14 of the clamping jaw 12 comes into contact with the bottom region 2B and starts to act on the bead wire 3 and the moment at which the seat 14, which has remained in contact with the bottom region 2B, reaches the deployed position, which corresponds to the desired clamping of the bead wire 3.

For this reason, a maximum limit will preferably be imposed on the axial displacement allowed during the passage from the retracted configuration to the deployed configuration, and more particularly during the abovementioned clamping travel.

By way of indication, and as indicated above, this limit may be fixed for example at 0.5 mm (five tenths of a millimetre).

By way of indication, the limit to axial displacement allowed during the clamping travel, from the intermediate configuration to the fully deployed configuration, will preferably be fixed at 0.1 mm (one tenth of a millimetre).

The configuration of the articulated parallelogram 20, and in particular the length of the first and second sides 27A, 28A, and their starting and finishing inclination angle A27 with respect to the central axis Z1, will be adapted as a result, as is explained below.

Particularly preferably, the articulated parallelogram 20 is designed such that the inclination angle A27 changes sign during the passage from the retracted configuration to the deployed configuration, and more preferably during the clamping travel, meaning that the first side 27A and the second side 28A, during this deployment movement, tilt so as to reverse the orientation of their pitching inclination with respect to the central axis Z1, and therefore pass through an intermediate configuration in which said first and second sides 27A, 28A are parallel to the central axis Z1, and in which the inclination angle A27 is zero.

Structurally, this manifests itself in the fact that, in the retracted configuration, the third pivot 23 is situated at a radial distance d23 from the central axis Z1 that is less than the (fixed) radial distance d21 at which the first pivot 21 is located (FIG. 3), such that said third pivot 23 is closer to the central axis Z1 than the first pivot 21, while in the deployed configuration, the third pivot 23 is located at a radial distance d23 from the central axis Z1 that is greater than the radial distance 21 at which the first pivot 21 is located (FIG. 4), such that the third pivot 23 is further away from the central axis Z1 than the first pivot 21.

The deployment movement of the mobile base 26, and then the return retraction movement, and more preferably the portion of these movements that corresponds specifically to the clamping travel (and then to the corresponding return movement), therefore follows a circular arc that is advantageously distributed on either side of the extremum formed by the passage through the zero inclination angle A27, this having the effect of minimizing the axial displacement.

Specifically, the component of axial displacement which is generated by the first part of the deployment movement, during which the first side 27A leaves the starting position that it occupies in the retracted configuration, or more particularly in the partially deployed configuration, said starting position corresponding by convention to a negative inclination angle A27, in order to adopt an intermediate position parallel to the central axis Z1, that is to say the part of the movement during which the inclination angle A27 is reduced (in terms of absolute value) in order to arrive at a zero inclination, is compensated at least partially by the component of axial displacement, in the opposite direction, which is generated during the second part of the deployment movement, when the first side 27A leaves the intermediate position parallel to the central axis and increases its inclination angle A27 in order to reach the non-zero inclination (in this case positive by convention) which corresponds to the deployed configuration (clamping configuration).

The resultant axial displacement of the mobile base 26 with respect to the shaft 11 between the retracted configuration and the deployed configuration is therefore minimized, if not substantially eliminated, while the useful radial displacement of said mobile base 26 may be significant.

It will also be noted that the radial displacement of the mobile base 26, and therefore the radial displacement of the seat 14, which corresponds to the clamping travel, may in practice be relatively small, in particular on account of the virtually inextensible nature of the bead wire 3, which makes it possible to rapidly increase the clamping force with a radial displacement of small amplitude, as soon as contact of the seat 14 is established with the bottom region 2B. By way of indication, said radial displacement corresponding to the clamping travel could thus be between 2 mm and 10 mm, for example around 4 mm.

If a length of the sides 27A, 28A of the articulated parallelogram 20 is considered to be equal to 152 mm, as indicated above, a radial displacement of 4 mm corresponds to an angular travel (change in inclination angle A27) of around 3 degrees.

If this angular travel of 3 degrees, corresponding to the desired clamping travel, is distributed evenly with respect to the horizontal (i.e. with respect to the direction given by the central axis Z1), the angular displacement of the arms 27, 28 with respect to the horizontal position, known as the "neutral position", will therefore be +/−1.5 degrees.

The axial displacement of the mobile base 26, and therefore of the seat 14 and of the bead wire 3, when said mobile base 26 travels through this arc of 3 degrees passing through the horizontal position, is equal to the difference between, for the one part, the radius of said arc, namely the length L_27A of the side 27A, which corresponds to the axial position in which said mobile base 26 is located with respect to the fixed base 25 when the arm 27 is horizontal, and, for the other part, the projection of this same side 27A onto the horizontal when said side 27A has tilted through 1.5 degrees with respect to the horizontal in order to reach the deployed configuration.

Thus, in the above example, the axial displacement will be: L_27A−L_27A*cos(1.5 degrees), or, for a side length L_27A of 152 mm, an axial displacement of 0.052 mm, much lower than the limit of 0.1 mm set out above.

The deployment system 13 comprises of course a drive mechanism 30 which is designed to cooperate with the articulated parallelogram 20 in order for it to be possible to select and modify the radial position d26 of the mobile base 26 with respect to the fixed base 25, in order to pass from the retracted configuration to the deployed configuration, and vice versa, to return from the deployed configuration to the retracted configuration.

The drive mechanism 30 could move the mobile base 26 by deforming the articulated parallelogram 20, i.e. by modifying the geometric shaping of the articulated parallelogram in a controlled manner by appropriately varying the angles at the apex of the articulated parallelogram 20, by virtue of the relative mobility conferred by the first, second, third and fourth pivots 21, 22, 23, 24.

To this end, the drive mechanism 30 could comprise any suitable driving member 31, for example a cylinder 40, preferably a pneumatic cylinder, placed under the dependence of a suitable control unit, for example an electronic computer.

Preferably, said driving member 31 will drive a mobile member 32, such as a slider 32, in relative axial displacement, along the shaft 11 and the central axis Z1, with respect to the axial position, fixed on the shaft 11, of the first and second pivots 21, 22.

Thus, the deployment system 13 could be actuated, and more particularly the shaping of the articulated parallelogram 20 modified to pass from the retracted configuration to the deployed configuration, or vice versa, without it being necessary to axially move the articulated parallelogram 20 as a whole, and more particularly by keeping the first and second pivots 21, 22, and therefore the fixed base 25, in a fixed axial position on the shaft 11, set back from the central region 1C of the drum 1.

To deploy the seat 14, all that will be necessary will be to axially displace the slider 32, which is less bulky than the articulated parallelogram 20 as a whole, with respect to said articulated parallelogram 20, in this case by moving said slider 32 away from the (preferably common) axial position of the first and second pivots 21, 22 and moving said slider 32 axially towards the central region 1C.

Preferably, each clamping jaw 12, independently of the other clamping jaws 12, comprises its own individual deployment system 13, placed in the angular sector in question of the shaft 11, about the central axis Z1.

The different deployment systems 13, thus distributed—like the clamping jaws 12 that they actuate—in a star arrangement about the central axis Z1, could advantageously be coordinated, and in particular synchronized, by means of a single control unit, which will control the drive mechanism(s) 30 associated with the different clamping jaws 12.

Furthermore, the shaft 11 is preferably mounted so as to be movable in translation on the drum 1, along the central axis Z1, so as to be able to move the bead wire 3, which is carried by the seat 14 installed on said shaft 11, towards the equatorial plane P_EQ of the tyre 2 during the shaping step.

This movement of the shaft 11 axially towards the equatorial plane P_EQ of the tyre 2 is advantageously separate from and independent of the radial, or virtually radial, movements of the deployment system 13 and more particularly the radial, or virtually radial, movements of the mobile bases 26 of the articulated parallelograms 20.

It is thus possible to first of all clamp the bead wire 3 by radially deploying the clamping jaws 12 and then, once the bead wire 3 has been secured to the shaft 11 by the centrifugal clamping force F_clamp, to axially displace the bead wire 3, 3_1 so as to move it towards the equatorial plane P_EQ, and the other bead wire 3_2, so as to shape the carcass 4.

According to a preferred feature which may constitute a wholly separate invention, in particular in combination with any deployment system 13 or any elevator system using an articulated parallelogram 20 mounted on a support of the shaft 11 type or any other appropriate support, similar by convention to a shaft 11 and extending in a direction considered to be a central axis Z1, wherein said articulated parallelogram 20 is used in connection with the deployment of a drum 1 for building pneumatic tyres or for any other application, the deployment system 13 comprises:

- a slider 32 which is guided on the shaft 11, preferably in translation, so as to be able to move, under the control of a driving member 31, such as a cylinder 40 having a piston 41, at least along an axial movement component that is parallel to the central axis Z1,
- a pusher 33 which is secured to the mobile base 26 of the articulated parallelogram 20 and which has, with respect to the slider 32 and to the central axis Z1, a convex curved ramp 34,
- a connecting shoe 35 which is carried by the slider 32, which has a concave cradle 36 with which the ramp 34 of the pusher 33 cooperates in sliding contact, and which is mounted on the slider 32 in a tilting manner by means of a pivot known as the "pitch pivot" 37 so as to be able to adapt its inclination with respect to the central axis Z1 depending on the position of said connecting shoe 35 along the ramp 34 of the pusher 33, such that a movement of the slider 32 on the shaft 11 along the central axis Z1 is converted by the sliding of the connecting shoe 35 on the ramp 34 of the pusher 33 into a variation in the radial distance d33 of the pusher 33 from the central axis Z1, and therefore into a corresponding variation in the radial distance d26 of the mobile base 26 of the articulated parallelogram 20 with respect to the central axis Z1.

For the convenience of depiction, the radial distance d26 of the mobile base from the central axis Z1 may be equated to the radial distance d23 of the third pivot, and more particularly of the axis of said third pivot 23, from the central axis Z1, since said third pivot 23 is part of said mobile base 26.

The axis of the pitch pivot 37 is advantageously parallel to the axes of the first, second, third and fourth pivots 21, 22, 23, 24, and therefore normal to the sagittal plane PS.

As indicated above, the slider 32 is moved on the shaft 11 relative to the axial position, which is fixed with respect to said shaft 11, of the first and second pivots 21, 22, and therefore relative to the axial position, fixed with respect to the shaft 11, of the fixed base 25.

Of course, the angular position of the slider 32 on the shaft 11 in terms of azimuth about the central axis Z1 is indexed with respect to said shaft 11, such that the angular position in terms of azimuth of the slider 32 coincides with the angular position in terms of azimuth of the corresponding mobile base 26.

The centres of curvature of the cradle 36 and of the ramp 34, and more particularly said centres of curvature considered in the sagittal plane PS, will both be oriented on the same side with respect to the interface between the cradle 36 of the connecting shoe 35 and the ramp 34 of the pusher 33, and situated radially, with respect to the central axis Z1, beyond the centre of the pitch pivot 37.

Preferably, said centres of curvature of the cradle 36 and of the ramp 34 will be coincident, such that the respective curvatures of the cradle 36 and of the ramp 34 are identical, and such that the cradle 36 thus perfectly hugs the ramp 34.

Preferably, the cradle 36 will have, in particular in the sagittal plane PS, a curvature of constant sign, meaning it will not have a reversal of curvature, and the same will go for the ramp 34, which will preferably have a curvature of constant sign, and of the same sign as the curvature of the cradle 36.

Particularly preferably, the radius of curvature of the cradle 36, in particular in the sagittal plane PS, will be constant, such that the cradle 36 is in the shape of a circular arc.

More generally, the cradle 36 will preferably form a portion of a straight circular-base cylinder, the generatrix of which is parallel to the axis of the pitch pivot 37, parallel to the axis of the first, second, third and fourth pivots 21, 22, 23, 24, and therefore normal to the sagittal plane PS.

Similarly, the ramp 34 will preferably be in the shape of a circular arc, along a portion of a circular-base cylinder, the generatrix of which is parallel to the axis of the pitch pivot 37, and therefore normal to the sagittal plane PS, and the radius of curvature of which is preferably equal to that of the cradle 36.

Advantageously, the use of a curved interface geometry between the cradle 36 and the complementary ramp 34 makes it possible to convert, in an effective, progressive, and well-controlled manner, the axial force which is generated by the driving member 31, and which tends to axially move the slider 32, in this case in the direction of the equatorial plane P_EQ, into a radial force, in this case into the centrifugal clamping force F_clamp.

In particular, it is possible to progressively generate, but nevertheless to rapidly increase, the radial clamping force F_clamp, by using for this purpose an axial travel of the slider 32 of relatively short extent, thereby making it possible to preserve a compact, although powerful, deployment system 13.

This curved interface between the cradle 36 and the ramp 34 also provides a large contact surface area, which ensures great stability and makes it possible to generate a particularly high radial component of clamping force F_clamp, while allowing better control of the contact pressures and the associated phenomena of friction or of deformation.

In this regard, it will be noted that it is possible to use, in particular to produce the shoe 35 and more particularly the cradle 36, a copper-based alloy, for example a bronze, which will make it possible to establish a metal/metal contact with the ramp 34, this being highly resistant to compression but only putting up little frictional resistance to the sliding movement of the cradle 36 on the ramp 34, and which will therefore not require maintenance or additional lubrication.

The use of a curved geometry and the control of the associated friction also makes it possible, as will be described in detail below, to define an irreversibility threshold, from which the slider 32 and the shoe 35 occupy, with respect to the ramp 34 and the bead wire 3, a self-immobilizing position in which they prevent the spontaneous return of the slider 32 under the force exerted by the bead wire 3 on the seat 34 in reaction to the clamping force F_clamp, and thus lock the deployment system 13 in the deployed configuration.

Preferably, the slider 32 is driven by a driving member 31 formed by a cylinder 40, preferably a pneumatic cylinder, which has a piston 41 mounted in a movable manner in a sleeve 42.

Such a cylinder 40 advantageously makes it possible to generate, relatively simply, a significant axial thrust force, which is then converted into a radial clamping force F_clamp by the above-described driving mechanism 30.

Advantageously, the axial thrust force could be all the higher since it is possible, by virtue of the cylinder 40 being offset away from the central region 1C of the drum, made possible by the arrangement in the form of a parallelogram that is the subject of the invention, to provide a sleeve 42 and a piston 41 which have a section, and therefore a useful surface exposed to pressure, which is particularly large.

The cylinder 40 could preferably be an annular cylinder, centred on the central axis Z1, the piston 41 of which, which is also annular, could advantageously simultaneously actuate several deployment mechanisms 13, and therefore several clamping jaws 12, or even all of the clamping jaws 12 distributed around the circumference of the drum 1.

Preferably, as can be seen in FIGS. 3 and 4, the slider 32 can be carried by the piston 41, while the fixed base 25 of the articulated parallelogram 20 is fixed to the sleeve 42 of the cylinder 40.

Such an arrangement advantageously combines compactness, simplicity and robustness.

The creation of the sealing between the piston 41 and the sleeve 42 is likewise simplified, since this sealing can be obtained for example by means of simple scraper seals 43, 44, for example O-rings or lobed seals, in this case centred on the central axis Z1. Said seals 43, 44 are advantageously housed in grooves that are concentric with the central axis Z1.

Furthermore, the static sealing between the shaft 11 and the cylinder head of the cylinder 31, and consequently between the sleeve 42 and the shaft 11, is preferably provided by an O-ring 45, as can be seen in FIG. 3.

According to a preferred feature, which may constitute a wholly separate invention, regardless otherwise of the arrangement of the deployment system 13, and for example independently or in combination with an articulated parallelogram 20 according to the invention, the deployment system 13 has a non-return locking arrangement 50, which is activated during the passage from the retracted configuration to the deployed configuration, so as to prevent any spontaneous return to the retracted configuration from the deployed configuration.

More particularly, said non-return locking arrangement 50 allows the deployment system 13 to withstand the action exerted by the bead wire 3 on the seat 14, under the effect of gravity and/or as a reaction to the clamping force F_clamp.

Advantageously, such a non-return locking arrangement 50 makes it possible, on account of its self-locking action, to keep the bead wire 3 in position, clamped and centred on the deployed seat 14, even if the driving member 31 stops being activated, and, more particularly, even if the energy supply of said driving member 31 is interrupted, deliberately or otherwise, for example if the pressure supply of the cylinder 40 is interrupted.

Thus, energy can be saved and operational safety can be increased, since it is possible, as soon as the deployed configuration has been reached and the non-return locking arrangement 50 has been activated, to release the force exerted by the driving member 31, without any risk of the deployment system 13 sagging.

Once the non-return locking arrangement 50 has been activated, the unlocking of the deployment system 13 should be brought about, that is to say intentionally carried out, to allow the return to the retracted configuration.

According to one possible implementation, the non-return locking arrangement 50 is obtained by a toggle effect, during which the travel of the slider 32 is provided such that, during the passage from the retracted configuration to the deployed configuration, the centre of the pitch pivot 37 carried by said slider 32 reaches, and preferably crosses, the imaginary plane, known as the "force plane" PF, which is normal to the central axis Z1 and which contains the closed contour, known as the "mean line" L3, formed by all of the centres of the cross sections of the bead wire 3 as considered along said bead wire 3, about the central axis Z1.

In practice, the centripetal constriction force which is exerted by the bead wire 3 on the deployed seat 14, in reaction to the centrifugal clamping force F_clamp, is in fact contained substantially in this force plane PF, situated vertically in line with the annular groove 17.

Consequently, said force plane PF constitutes a locking threshold in that, when the slider 32 moves sufficiently along the shaft 11, parallel to the central axis Z1, in order that the centre of the pitch pivot 37 passes from one side of said force plane PF to the other, the torque exerted, about the pitch pivot 37, by the reaction of the bead wire 3 against the seat 14, and therefore the torque exerted against the connecting shoe 35 and the slider 32, changes sign.

If a stop is provided in order to limit the travel in translation of the slider 32 on the shaft 11 in the direction of the equatorial plane P_EQ, or a stop is provided in order to limit the tilting travel, in this case in the clockwise direction in FIGS. 3 and 4, of the connecting shoe 35 on the slider 32 via the pitch pivot 37, this change in sign, which tends to bring about reversal of the pitching movement of the connecting shoe 35, has the effect of firmly immobilizing the connecting shoe 35 against the slider 32, and consequently of locking the ramp 34, the pusher 33, and the clamping jaw 12 carried by the latter in position.

According to another possible implementation, the non-return locking arrangement 50 is obtained by friction, by an appropriate arrangement of the pitch pivot 37, of the cradle 36 and of the ramp 34 of the pusher 33, which is chosen such that, when the axial position of the slider 32 reaches a threshold known as the "locking threshold", which is sufficiently close (as can be seen in FIG. 4) to the axial position of an imaginary plane, known as the "force plane" PF, which is normal to the central axis Z1 and which contains the closed contour, known as the "mean line" L3, formed by all of the centres of the cross sections of the bead wire 3 as considered along said bead wire 3, about the central axis Z1, the resultant force, which results from the stresses exerted on the seat 14 and which is exerted at the interface between the cradle 36 of the connecting shoe 35 and the ramp 34 of the pusher 33, is kept confined inside the friction cone of said interface.

To this end, it may be possible in particular, depending on the constituent materials of the cradle 36 and of the ramp 34, and therefore depending on the coefficient of friction between these elements, and depending on the dimensions of the bases 25, 26 and sides 27A, 28A of the articulated parallelogram 20, to choose appropriate dimensioning and an appropriate geometric arrangement of the pitch pivot 37, of the travel of the slider 32, and of the radius of curvature of the cradle 36 and of the ramp 34, so as to make it possible, once the slider 32 has reached or passed the locking threshold, to prevent the ramp 34 from sliding in the cradle 36, at least in the direction of a return to the retracted configuration.

As a result, in the deployed configuration, the slider 32 cannot be spontaneously sent backwards, towards the position that said slider 32 occupies in the retracted configuration, just under the action exerted by the bead wire 3 on the seat 14, such that said slider 32 remains interposed radially, as do the connecting shoe 35 and the pusher 33, between the clamping jaw 12, and more particularly the mobile base 26, for the one part, and the central axis Z1 of the drum 1 for the other part, thereby making it possible to ensure the continuity of support of the clamping jaw 12, and therefore of the seat 14, against the bead wire 3.

In order to bring about the unlocking of the deployment system 13, in order to return the seat 14 from the deployed configuration to the retracted configuration, it may be possible for example to apply a slight negative pressure to the chamber of the cylinder 40 in order to return the piston 41 and the slider 32, in this case axially away from the central region 1C of the drum, sufficiently to unlock said deployment system 13.

In a variant, provision could be made for the cylinder 40 to be a double-acting cylinder comprising, axially on either side of the piston 41, for the one part a first chamber, known as the "deployment chamber", intended to be pressurized to pass the piston 41, the slider 32 and more generally the deployment system 13 from the retracted configuration to the deployed configuration, as indicated above, and, for the other part, on the other side of the piston 41, a second chamber, known as the "return chamber", intended to be pressurized to bring about the unlocking of the deployment system 13 and the return of the piston 41, the slider 32 and more generally the deployment system 13 to the retracted configuration. Such a solution will make it possible to take advantage, if necessary, of a greater unlocking and return force.

In the case of a non-return locking arrangement 50 having a toggle, this active bringing about of unlocking, in this case for example by the application of negative pressure to the deployment chamber of the cylinder 40 and/or the pressurization of the return chamber of said cylinder 40, will have the effect of returning the slider 32 below the locking threshold of said toggle, in this case typically by returning said slider 32 so as to make it cross back over the force plane PF in the opposite direction to the locking direction, that is to say by moving said slider 32 axially away from the equatorial plane P_EQ and the central region 1C.

Respectively, in the case of a non-return locking arrangement 50 having a friction cone, this active bringing about of unlocking will have the effect of reconfiguring the geometric disposition of the slider 32, of the connecting shoe 35 and of the ramp 34, and therefore of reconfiguring the friction cone at the interface considered, so as to allow the ramp 34 of the pusher 33 to slide on the cradle 36 of the sliding shoe 35 in the direction of a return to the retracted configuration.

Of course, if the non-return locking arrangement 50 adopts a different form, for example that of a ratchet acting mechanically on one of the mobile elements of the deployment system 13 in order to prevent said mobile element from moving in the direction of a return to the retracted configuration, appropriate unlocking means could be provided, such as a connecting rod, which will make it possible to retract the ratchet on demand in order to release the mobile element held by said ratchet, and thus to free up the deployment system 13.

It will also be noted that, advantageously, once the non-return locking arrangement 50 has been unlocked, the elastic constriction force that is exerted by the banding strip 16, or if appropriate by the annular return spring, on the clamping jaws 12 assists the return movement of the deployment system 13 into the retracted configuration.

Figure 5:
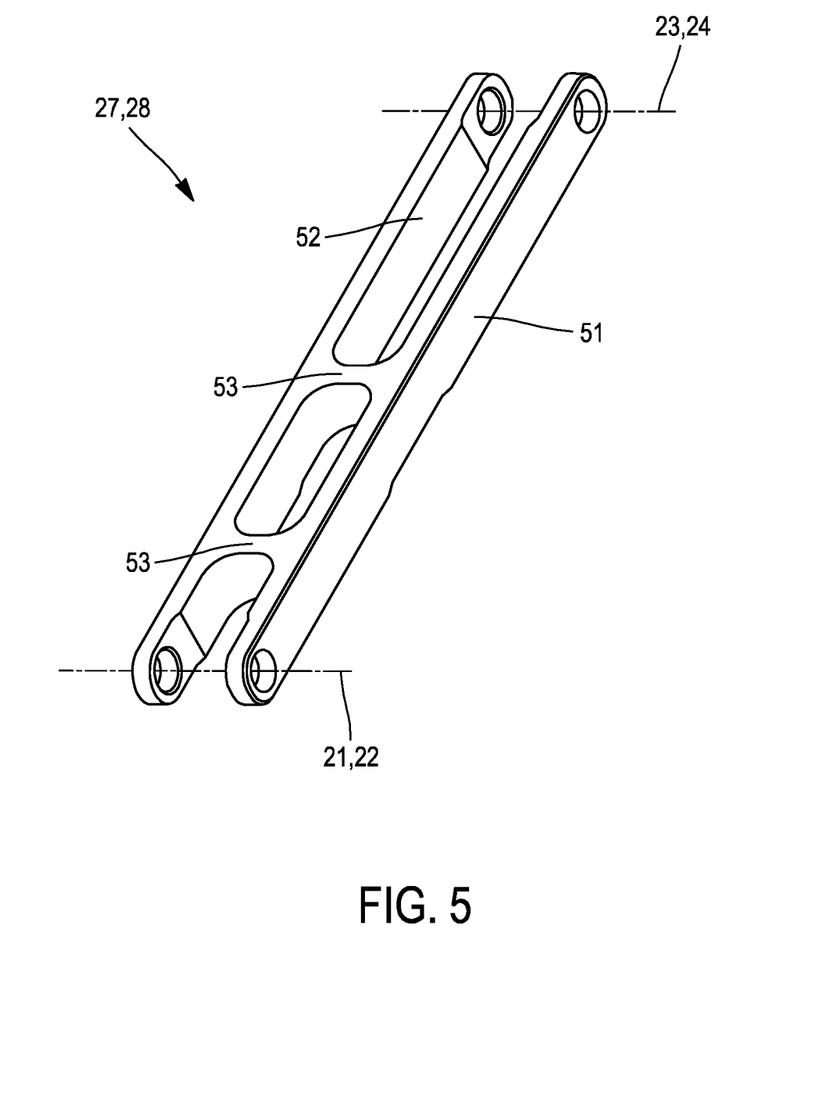
FIG. 5 illustrates, in a perspective detail view, an exemplary embodiment of an arm of the articulated parallelogram, said arm having a structure with two side members connected together by crosspieces.

Furthermore, as can be seen in FIG. 5, the first arm 27 and/or the second arm 28 of the articulated parallelogram 20 may preferably comprise at least two side members 51, 52 which each connect together the two pivots 21, 23, and 22, 24, respectively, connected by the arm 27, 28 in question, said side members 51, 52 being held together by one or more crosspieces 53.

Such a structure, of the lattice beam type, advantageously confers excellent rigidity on the arm 27, 28, while preserving the lightweight nature thereof.

It also allows the arm 27 to form a yoke, thereby ensuring precise and stable guidance of said arm 27 on its pivots 21, 23, giving said arm a plurality of points of contact distributed along the axis of each of said pivots 21, 23.

Of course, preferably, the drum 1 could comprise, as schematically indicated by way of dashed lines in FIG. 2, a first shaft 11_1 and a second shaft 11_2 which are mounted so as to move in translation along the central axis Z1 and are each provided with an expandable seat 14_1, 14_2, such that it is possible to shape the pneumatic tyre 2 by clamping a first bead wire 3_1 on the expandable seat 14_1 of the first shaft 11_1 and a second bead wire 3_2 on the expandable seat 14_2 of the second shaft 11_2 and then by moving the two shafts 11_1, 11_2 axially towards one another so as to move the two bead wires 3_1, 3_2 carried by said shafts 11_1, 11_2 axially towards one another.

Said shafts 11_1, 11_2 will thus be mounted so as to be movable in opposition, such that each can move the bead wire 3_1, 3_2 that they carry towards the equatorial plane P_EQ and thus, during the shaping operation, to force or accompany the movement that makes it possible to curve the carcass 4 in order to attach the crown block 7 to said carcass 4 and then to carry out the roller-pressing operation.

The deployment systems 13, preferably having an articulated parallelogram 20, which are carried by each of said shafts 11_1, 11_2 could be as described above.

Of course, the invention is in no way limited only to the abovementioned exemplary embodiments, a person skilled in the art being notably capable of isolating or freely combining one or another of the above-described features with one another, or of substituting equivalents therefor.

The invention claimed is:

1. A drum for manufacturing a tire, the drum comprising at least one annular bead wire, the drum having a central axis and being provided with a clamping device which comprises a shaft fitted along the central axis, the shaft bearing a plurality of clamping jaws which are distributed in several angular sectors about the central axis and which are placed under the control of a deployment system which makes it possible to modify a radial distance of the clamping jaws with respect to the central axis such that the clamping jaws define an expandable seat that the deployment system moves alternately from a retracted configuration, in which the expandable seat occupies a first diameter, the first diameter being a resting diameter, which is less than an inside diameter of the bead wire, to a deployed configuration, in which the clamping jaws are radially further away from the central axis than in the retracted configuration, such that the expandable seat extends over a second diameter, the second diameter being a clamping diameter, which is greater than the resting diameter and which allows the expandable seat to engage against the inside diameter of the bead wire and to exert a centrifugal clamping force on the bead wire, wherein the deployment system comprises an articulated parallelogram, the four apexes of which respectively form a first, a second, a third and a fourth pivot, the first pivot and the second pivot being secured to the shaft and positioned respectively at a first radial distance from the central axis and at a second radial distance from the central axis, greater than the first radial distance, so as to define a first base, the first base being a fixed base of the articulated parallelogram which extends transversely to the central axis, while the third pivot and the fourth pivot are secured to a clamping jaw and define a second base, the second base being a mobile base of the articulated parallelogram, which is kept parallel to the fixed base by a first arm which connects the first pivot to the third pivot so as to define a first side of the articulated parallelogram, and by a second arm which connects the second pivot to the fourth pivot so as to define a second side of the articulated parallelogram, parallel to the first side, wherein the deployment system comprises a drive mechanism designed to cooperate with the articulated parallelogram so that it is possible to select and modify the radial position of the mobile base with respect to the fixed base in order to pass from the retracted configuration to the deployed configuration and vice versa, and wherein the drive mechanism of the deployment system comprises:
    a slider which is guided on the shaft so as to be able to move, under control of a driving member, at least along an axial movement component that is parallel to the central axis;
    a pusher which is secured to the mobile base of the articulated parallelogram and which has, with respect to the slider and to the central axis, a convex curved ramp; and
    a connecting shoe which is carried by the slider, which has a concave cradle with which the ramp of the pusher cooperates in sliding contact, and which is mounted on the slider in a tilting manner by means of a pitch pivot so as to be able to adapt its inclination with respect to the central axis depending on a position of the connecting shoe along the ramp of the pusher,
    such that a movement of the slider on the shaft along the central axis is converted by the sliding of the connecting shoe on the ramp of the pusher into a variation in the radial distance of the pusher from the central axis, and therefore into a corresponding variation in the radial distance of the mobile base of the parallelogram with respect to the central axis.

2. The drum according to claim 1, wherein the slider is driven by a driving member formed by a cylinder, which has a piston mounted in a mobile manner in a sleeve, and
    wherein the slider is carried by the piston, while the fixed base of the articulated parallelogram is fixed to the sleeve of the cylinder.

3. The drum according to claim 1, wherein an inclination angle formed, with respect to the central axis, by the first side of the articulated parallelogram remains between −15 degrees and +15 degrees during passage from the retracted configuration to the deployed configuration and vice versa.

4. The drum according to claim 1, wherein the deployment system has a non-return locking arrangement, which is activated during passage from the retracted configuration to the deployed configuration, so as to prevent any spontaneous return to the retracted configuration from the deployed configuration.

5. The drum according to claim 1, wherein the deployment system has a non-return locking arrangement, which is activated during passage from the retracted configuration to the deployed configuration, so as to prevent any spontaneous return to the retracted configuration from the deployed configuration, and
    wherein the non-return locking arrangement is obtained by a toggle effect, during which travel of the slider is provided such that, during passage from the retracted configuration to the deployed configuration, the center of the pitch pivot carried by the slider reaches an imaginary force plane, which is normal to the central axis and which contains a closed contour, the closed contour being a mean line, formed by all of the centers of cross sections of the bead wire as considered along the bead wire, about the central axis.

6. The drum according to claim 1, wherein the deployment system has a non-return locking arrangement, which is activated during passage from the retracted configuration to the deployed configuration, so as to prevent any spontaneous return to the retracted configuration from the deployed configuration, and
    wherein the non-return locking arrangement is obtained by friction, by an appropriate arrangement of the pitch pivot, of the cradle and of the ramp of the pusher, which is chosen such that, when an axial position of the slider reaches a locking threshold, which is sufficiently close to an axial position of an imaginary force plane, which is normal to the central axis and which contains a closed contour, the closed contour being a mean line, formed by all of the centers of cross sections of the bead wire as considered along the bead wire, about the central axis, the resultant force, which results from stresses exerted on the expandable seat and which is exerted at an interface between the cradle of the connecting shoe and the ramp of the pusher, is kept confined inside a friction cone of the interface.

7. The drum according to claim 1, wherein the clamping jaws are provided, on their radially outer faces, with a circumferential housing, which defines the expandable seat for receiving the bead wire.

8. The drum according to claim 7, wherein the drum comprises a banding strip, made of elastomer material, which forms a continuous annular band that is closed about the central axis, which fits in the circumferential housing of the clamping jaws, and which is designed so as to exhibit an annular groove forming the expandable seat for receiving the bead wire.

9. The drum according to claim 1, wherein the first arm, the second arm or both the first and second arms of the articulated parallelogram comprise at least two side members which each connect together the two pivots connected by the arm in question, the side members being held together by one or more crosspieces.

10. The drum according to claim 1, wherein the drum comprises a first shaft and a second shaft which are mounted so as to move in translation along the central axis and are each provided with an expandable seat such that it is possible to shape the pneumatic tire by clamping a first bead wire on the expandable seat of the first shaft and a second bead wire on the expandable seat of the second shaft and then by moving the two shafts axially toward one another so as to move the two bead wires carried by the shafts axially toward one another.

* * * * *